H. P. LAMBERT.
SPRING SHACKLE.
APPLICATION FILED APR. 29, 1921.
1,437,185.
Patented Nov. 28, 1922.
3 SHEETS—SHEET 2.
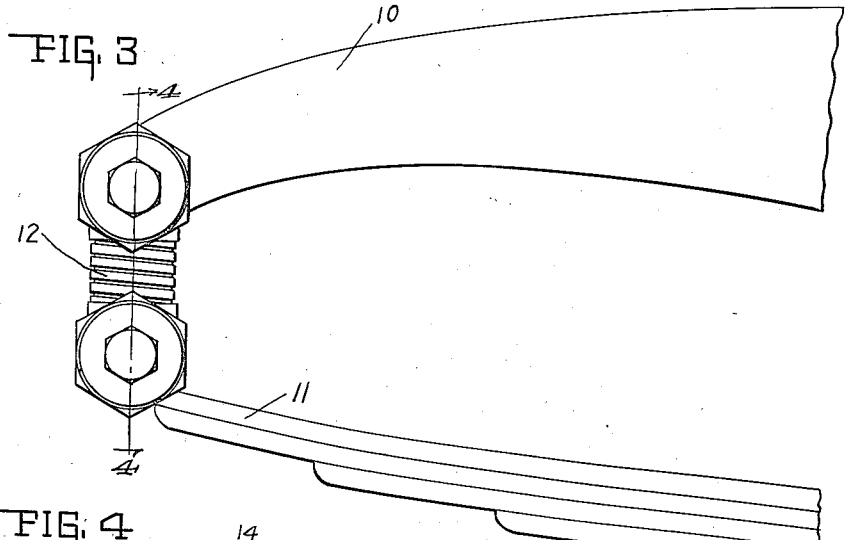
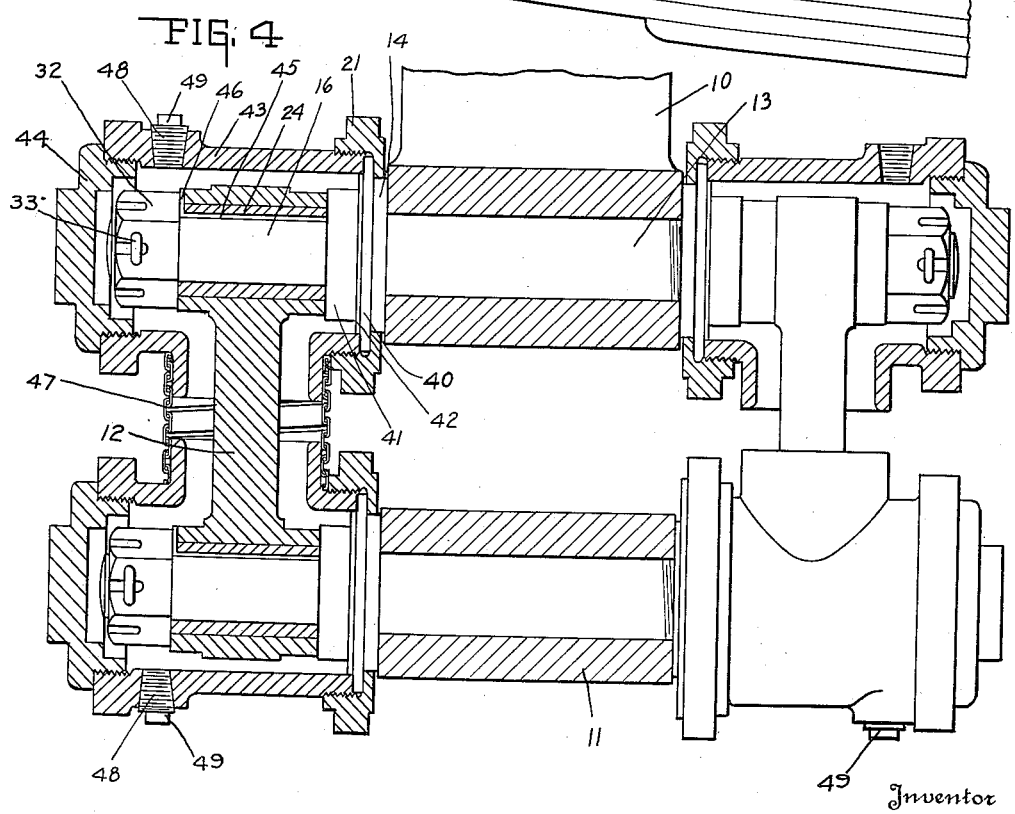
Inventor
HOMER P. LAMBERT.
By
Attorneys.

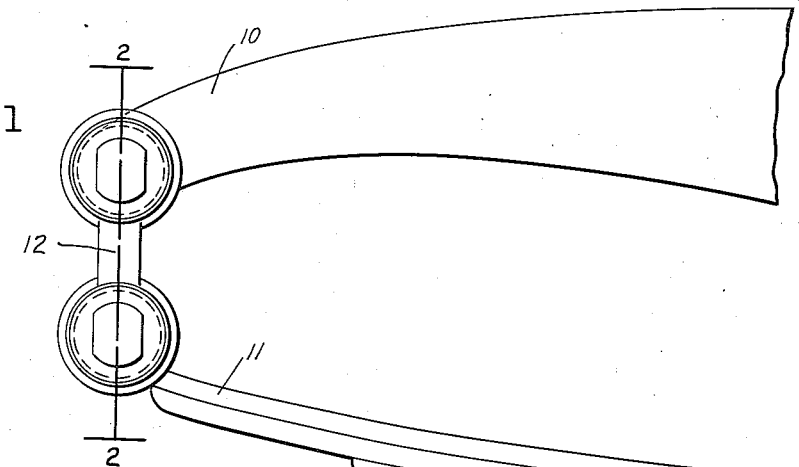
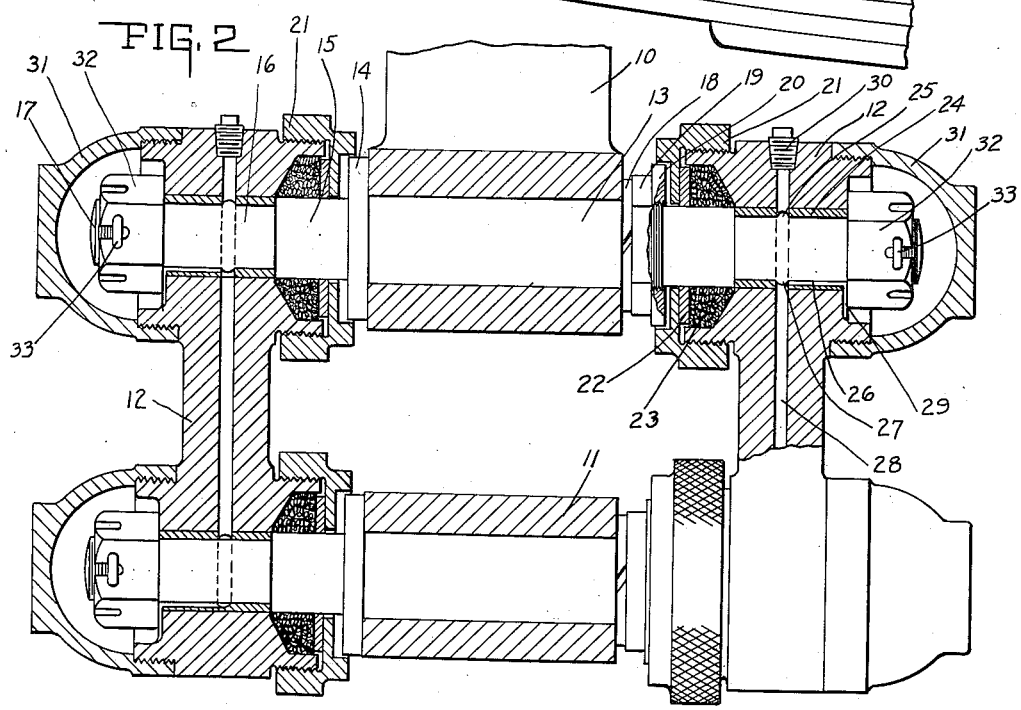

H. P. LAMBERT.
SPRING SHACKLE.
APPLICATION FILED APR. 29, 1921.
1,437,185.
Patented Nov. 28, 1922.
3 SHEETS—SHEET 3.
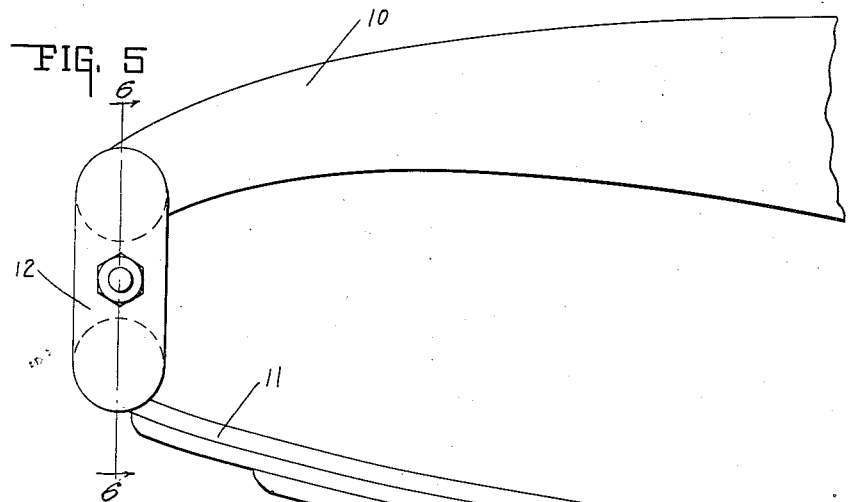
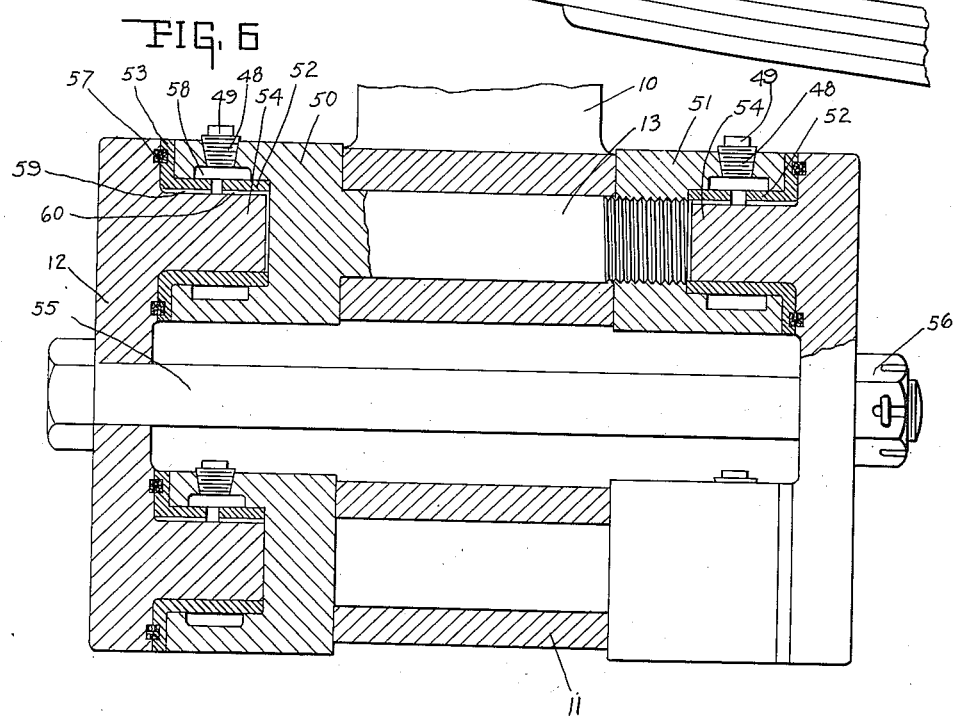
Inventor
HOMER P. LAMBERT.
By
Attorneys Patented Nov. 28, 1922.

1,437,185

UNITED STATES PATENT OFFICE.

HOMER P. LAMBERT, OF ANDERSON, INDIANA.

SPRING SHACKLE.

Application filed April 29, 1921. Serial No. 465,408.

*To all whom it may concern:*

Be it known that I, HOMER P. LAMBERT, a citizen of the United States, and a resident of Anderson, county of Madison, and State of Indiana, have invented a certain new and useful Spring Shackle; and I do hereby declare that the following is a full, clear, and exact description thereof, reference being had to the accompanying drawings, in which like numerals refer to like parts.

This invention relates to a spring shackle for vehicles and particularly to the construction thereof whereby the entire bearing surface may be constantly lubricated and the bearings protected from dust and water.

Heretofore, the spring shackles have been so constructed that the bearings have been in the end of the frame and spring, these parts being connected by a shackle mounted on the shafts extending through the bearings. With this arrangement dust and water accumulates in the bearings which are not housed or enclosed and the lubrication thereof is made difficult for this reason, and there is no satisfactory means of sufficiently lubricating such bearings.

This invention contemplates a more perfect bearing construction which will enclose and protect the bearings from dust and water and permit the complete, free and constant lubrication thereof.

The principal feature of the invention lies in having the working bearings on either side of the frame and spring rather than within the ends, the supporting shaft being fixedly mounted on the spring and frame, and the working bearings for supporting the ends of the fixed shaft being mounted on the shackles.

Another feature of the invention is in the means for enclosing and housing the working bearings in the shackles for protecting said bearings from dust and water, and still another feature lies in the method of lubrication.

The full nature of this invention will be understood from the accompanying drawings and the following description and claims.

Fig. 1 is a side elevation showing the shackles in position for shackling the ends of the spring and frame. Fig. 2 is a section taken on the line 2—2 of Fig. 1 with a portion thereof in elevation. Fig. 3 is the same as Fig. 1 showing a modified form thereof. Fig. 4 is a central vertical section taken on the line 4—4 of Fig. 3 showing a portion in elevation. Fig. 5 is the same as Fig. 1 showing a second modified form thereof. Fig. 6 is a central vertical section taken on the line 6—6 of Fig. 5 showing a portion thereof in elevation.

In the drawings there is shown the end portion of a vehicle frame 10 or spring member with a semi-elliptical spring member 11 shackled thereto by the shackle 12. Extending through the end of the frame 10 and likewise through the end of the spring 11, there is a spindle 13 fixedly secured therein and extending outwardly on either side. For convenience, the relation of the spindle to the frame as hereinafter described will likewise apply to this spring.

The spindle is provided on one side of the frame with a collar 14, a recessed surface 15 and a bearing surface 16, all integral, with screw threads 17 on the outer end. The other end of the spindle is inserted through the hole provided therefor formed in the frame, and a split washer 18 is mounted thereon. The spindle is securely clamped to the frame between the fixed collar 14 and the washer 18, by the nut 19, which is provided with the collar 20. After the spindle has been placed in the frame and the nut 19 tightened up thereon, the nuts 21 are placed in position to be screwed on the inner side of the shackles 12. Between the nut and the shackle 12 there is mounted a washer 22 and the packing 23, said packing being positioned in suitable recesses formed in the head of said shackle.

The head of the shackle is provided with a bearing 24 which is provided with an annular groove 25 communicating with the longitudinal groove 26 on its inner surface. The annular groove 25 communicates with radial holes 27 arranged to register with the passageway 28 extending through the heads and shank of the shackle. The outer end of the groove 26 is cut away so that said groove will be in communication with a cut away portion 29 in the head of the shackle, whereby lubricant introduced into said shackle through the opening 30 will pass through the passage 28, to the groove 27 and then through the lower portion of the passage 28 to the lower shackle bearing.

A portion of the lubricant will also pass through the opening in the end thereof to the cut away portion 29 and escape from the bearing into the chamber embraced by the dust cap 31 which is screwed on the outer end of the shackle head. The shackle with its bearing is adjusted and held on the spindle 13 by the nuts 32 screwed on each end thereof in loose engagement with the shackle head so as to not bind said shackle to the spindle, the nuts being locked in proper position by the usual cotter pin 33. It will be evident that instead of the ends of the frame and spring oscillating on a shaft or rod held in fixed position relative to the shackle, the shackle oscillates about a spindle held rigidly in the ends of the frame and spring. The lubricant which is introduced at the top will pass downwardly through the passageway 28 to the spindle 16, through the annular groove 27, spreading out between the bearing surface so as to lubricate the spindle and bushing 24, and a portion passing through the laterally extending groove 27 into the chamber formed by the dust cap 31, whereby said chamber will maintain a quantity of oil in reserve. The same is true of the lower bearings which are lubricated through the upper bearings. It will also be observed that the dust cap 31 and the nut 21, together with the packing 23, will at all times prevent the oil from escaping from the shackle and the dust and water from working into the bearings or the nuts thereof as happens in the usual and well known shackle construction.

In the modified form shown in Fig. 3 the construction is substantially the same excepting that at the adjacent collar 14 there are provided additional collars 40 and 41 with a shoulder 42 upon which is seated the housing 43. The collars 40 and 41 and shoulder 42 are integral with the spindle on one end and are screwed thereon on the other end, whereby the spindle 32 may be inserted in the opening in the frame and spring. The housing 43 is locked in position by the screw nut 21, held rigidly against the collar 40, said housing being properly positioned by the shoulder 42. The outer end of the housing is closed by the screw cap 44 adapted to screw on the outer end thereof. The bushing 24 instead of having an annular groove is provided with a longitudinal groove 45 on the inner surface thereof extending its entire length and communicating with an opening 46 extending through the head of the shackle 12. The lower portion of the housing extends downwardly surrounding the shank of the shackle and spaced therefrom, and is also spaced from a similar housing mounted on the lower spindle. The adjacent ends of the housings are connected by the flexible tubing 47. The construction of this modified form is such that the housing remains in fixed relation with the spindle, frame and spring, while the shackle oscillates about the ends of the spindle within the housings. Obviously the upper and lower housings will move back and forth in the ends of the frame and spring, with relation to each other, which movement is compensated for by the flexible tubing. The lubricant is discharged into the housing through the openings 48, which are closed by the caps 49 so as to completely fill both housings surrounding the shackle and passing into the bearings for lubricating the same through the communication 46 and the groove 45. A supply of lubricant would be maintained in the housing which would at all times keep the bearings properly lubricated and free from dirt and water.

In the modified forms shown in Figs. 5 and 6, the spindle 13 has a head 50 integral with one end thereof and a similarly designed head 51 on the other end adapted to screw on the threaded end of the spindle. The heads 50 and 51 are provided with annular recesses in which the bushings 52 are mounted, said bushings having a radial flange 53 on their outer end adapted to embrace the ends of the heads 50 and 51. The shackles 12 are provided with annular recesses in the heads 50 and 51 within the bushings 52. The shackles are held within the bushings and heads by the tie rod 55 and nut 56. Between the vertical bearing surfaces of the shackles and bushings there are annular packing rings 57 for preventing the escape of the lubricant and protecting the bearing surfaces from water and dust. The heads 50 and 51 are provided with annular recesses 58 which surround the outer surface of the bearings which are filled with lubricant through the openings 48, the recesses or bearings 58 being adapted to maintain a reserve supply of oil which passes to the bearing surfaces through the communicating passage 59 in the bushings and the longitudinal groove 60 therein.

By means of any of the above forms of construction the shackle bearings will at all times be properly lubricated and protected, which is the principal object sought.

The invention claimed is:

1. A spring shackle for vehicles, in combination with the spring suspension of said vehicle including an upper member and a lower member shackled thereto, of spindles rigidly secured to said members and extending transversely thereof, shackle links pivotally mounted on each end of said spindles through which said spindles extend, and locking means secured on the ends of said spindles for engaging the outer side of said shackle links and securing the same thereon.

2. A spring shackle for vehicles, in combination with the spring suspension of said vehicle including an upper member and a lower member shackled thereto, of spindles rigidly secured to said members, shackle links having heads at each end thereof, bearings in each of said heads into which said spindles extend whereby said shackles may oscillate about said spindles, means for securing said shackles on said spindles so that they may oscillate thereon and permit relative longitudinal movement between said members, and a lubricating passage communicating with the upper and lower housings and bearing surfaces for lubricating the same.

3. A spring shackle for vehicles, in combination with the spring suspension of said vehicle including an upper member and a lower member shackled thereto, of spindles rigidly secured to said members and having bearing surfaces extending on either side thereof, shackle links having bearing surfaces at each end thereof loosely mounted on the bearing ends of said spindles and on each of said members, means for locking said shackles on said spindles whereby the oscillating movement between said members will be compensated for between said shackles and spindles, and a lubricating passageway extending through said shackles to the bearings whereby lubricant may be applied thereto.

In witness whereof, I have hereunto affixed my signature.

HOMER P. LAMBERT.